(12) United States Patent  
Woodruff et al.

(10) Patent No.: US 7,601,204 B2
(45) Date of Patent: Oct. 13, 2009

(54) AIR CONDITIONING APPARATUS WITH INTEGRATED AIR FILTRATION SYSTEM

(75) Inventors: Mark D. Woodruff, Wills Point, TX (US); Kirk W. Beason, Tyler, TX (US); Larry Stephen Bias, Flint, TX (US); Robert G. Roycroft, Whitehouse, TX (US); Lester D. Sherrow, Whitehouse, TX (US); Stephen J. Vendt, Tyler, TX (US)

(73) Assignee: Trane International Inc., Piscataway, NJ (US)

( * ) Notice: Subject to any disclaimer, the term of this patent is extended or adjusted under 35 U.S.C. 154(b) by 393 days.

(21) Appl. No.: 11/516,263

(22) Filed: Sep. 6, 2006

(65) Prior Publication Data

US 2008/0053309 A1    Mar. 6, 2008

(51) Int. Cl.
*B03C 3/66* (2006.01)
(52) U.S. Cl. .................. 96/30; 95/73; 96/74; 96/81; 96/97
(58) Field of Classification Search ........... 96/30, 96/55, 59, 81, 97, 74; 95/67, 73
See application file for complete search history.

(56) References Cited

U.S. PATENT DOCUMENTS

| | | | | |
|---|---|---|---|---|
| 2,486,520 A | * | 11/1949 | Dahlman | 96/58 |
| 3,504,482 A | | 4/1970 | Goetti | |
| 3,513,634 A | * | 5/1970 | Angonese et al. | 96/81 |
| 3,654,747 A | * | 4/1972 | Remick | 96/58 |
| 4,477,263 A | * | 10/1984 | Shaver et al. | 95/7 |
| 5,071,455 A | | 12/1991 | Abedi-Asl | |
| 5,403,383 A | | 4/1995 | Jaisinghani | |
| 5,456,741 A | * | 10/1995 | Takahara et al. | 96/22 |
| 5,622,543 A | * | 4/1997 | Yang | 96/58 |
| 5,632,806 A | * | 5/1997 | Galassi | 96/16 |
| 5,702,507 A | * | 12/1997 | Wang | 96/55 |

(Continued)

FOREIGN PATENT DOCUMENTS

| | | |
|---|---|---|
| GB | 1 086 819 | 10/1967 |
| JP | 6-126210 A * | 5/1994 |

OTHER PUBLICATIONS

PCT International Preliminary Report on Patentability for counterpart PCT Application No. PCT/US2007/019278; Mar. 19, 2009; 7 pages.

*Primary Examiner*—Richard L Chiesa
(74) *Attorney, Agent, or Firm*—Conley Rose, P.C.; Shannon W. Bates

(57) ABSTRACT

An air conditioning apparatus includes a cabinet having air inlet and outlet openings and an intense field dielectric air filtration system disposed in the cabinet between the inlet and outlet openings. The filtration system includes a field charging unit and a filter unit. The filter unit may be mounted for removal from the cabinet on spaced apart support brackets connected to the cabinet or to a frame of the field charging unit. Electrical contact elements may be supported by the support brackets for engagement with corresponding contact elements on the filter unit and charging unit for establishing electrical communication between a power supply and the charging unit and filter unit, respectively. A shorting bar is aligned with the contact members on the filter unit for discharging high voltage potential upon removal of the filter unit from the cabinet.

39 Claims, 15 Drawing Sheets

U.S. PATENT DOCUMENTS

| | | | |
|---|---|---|---|
| 6,129,781 A * | 10/2000 | Okamoto et al. | 96/25 |
| 6,251,170 B1 * | 6/2001 | Hironaka et al. | 96/28 |
| 6,749,669 B1 * | 6/2004 | Griffiths et al. | 96/67 |
| 7,258,715 B2 * | 8/2007 | Cox et al. | 55/422 |
| 7,332,019 B2 * | 2/2008 | Bias et al. | 96/15 |
| 7,351,274 B2 * | 4/2008 | Helt et al. | 95/2 |
| 2002/0062739 A1 | 5/2002 | Cheng | |
| 2006/0016335 A1 * | 1/2006 | Cox et al. | 96/15 |
| 2007/0039462 A1 * | 2/2007 | Helt et al. | 95/6 |
| 2007/0039472 A1 * | 2/2007 | Bias et al. | 96/66 |

* cited by examiner

AIR CONDITIONING APPARATUS WITH INTEGRATED AIR FILTRATION SYSTEM

BACKGROUND OF THE INVENTION

Filtration of air being circulated by and through heating, ventilating and air conditioning (HVAC) apparatus has become an increasingly desirable and necessary process. The filtration of indoor air has become important to maintain and improve human health and to keep interior spaces and furnishings more clean than heretofore obtainable. In particular, an effective type of an electrically energized air filtration system is known as an intense field dielectric (IFD) filtration system. However, heretofore IFD type filtration systems, as well as other types of air filtration systems associated with HVAC equipment, have been furnished as add-on devices and have not been integrated into the equipment including, for example, equipment known as air handlers, furnaces, heat pumps and similar pieces of equipment, all fitting under the generic designation of air conditioning apparatus.

Certain improvements have been provided in intense field dielectric (IFD) air filtration systems, including those described and claimed in copending U.S. patent applications Ser. No. 11/205,656, filed Aug. 17, 2005 by Larry Stephen Bias et al. now U.S. Pat. No. 7,332,019 and Ser. No. 11/205,733, filed Aug. 17, 2005 by Robert W. Helt et al., now U.S. Pat. No. 7,351,274, both assigned to the assignee of the present invention. The subject matter of U.S. patent applications Ser. Nos. 11/205,656 and 11/205,733 is incorporated herein by reference. Intense field dielectric filtration (IFD) systems are particularly effective but also require certain features which heretofore have not been conducive to including such systems as an integral part of an air conditioning apparatus. Prior to the present invention, the integration of an electrically energized air filtration system and an IFD type air filtration system, in particular, into an air conditioning apparatus, including apparatus such as a so-called air handler, a forced air furnace, a heat pump and similar equipment, has not been achieved. However, the present invention solves certain problems associated with prior art HVAC equipment designs and air filter systems intended to be used in conjunction with such equipment.

SUMMARY OF THE INVENTION

The present invention provides an improved HVAC apparatus including, in particular, an apparatus with an efficient and effective air filtration system incorporated therein.

In accordance with an important aspect of the present invention, apparatus adapted for circulating conditioned air (either heated, cooled, humidified or dehumidified or a combination of same) includes an electrically energized air filtration system, preferably an intense field dielectric (IFD) filtration system, integrated into the apparatus. The integration of the air filtration system into the air conditioning apparatus cabinet, for example, provides for installing the apparatus in its working position without consideration for space required for eventual add-on filter equipment, and without concern for eventual modification of the apparatus controls, or the addition of a filtration system power supply unit and associated conductors, for example. Moreover, the integration of an IFD type air filtration system into a unit of air conditioning apparatus according to the present invention minimizes the risks associated with improper access to the filtration system components for removal from their working positions without, for example, prior shutoff of a source of electric power to the system.

In accordance with another important aspect of the present invention, an IFD air filtration system is integrated into the cabinet of a unit of forced air flow type air conditioning apparatus but is easily removable therefrom for replacement, servicing or cleaning, as required.

In accordance with still another aspect of the present invention, there is provided a unit of air conditioning apparatus which includes an IFD air filtration system which is operable at different levels of electric field intensity to minimize any adverse effects from the generation of ozone or the like. Still further, there is provided a unit of air conditioning apparatus which includes an IFD air filtration system wherein, upon gaining access to a filter unit of the system via a door or removable panel of the apparatus cabinet or upon removal of the filter unit from the apparatus cabinet, power to the air filtration system is disabled.

Still further in accordance with the invention, a forced air flow air conditioning apparatus may be provided which is easily modified to integrate an air filtration system therein, particularly one of the intense field dielectric (IFD) type, by way of minor modifications to support structure for the filtration system.

Those skilled in the art will further appreciate the above-mentioned advantages and superior features of the invention together with other important aspects thereof upon reading the detailed description which follows in conjunction with the drawings.

DETAILED DESCRIPTION OF PREFERRED EMBODIMENTS

Figure 1:
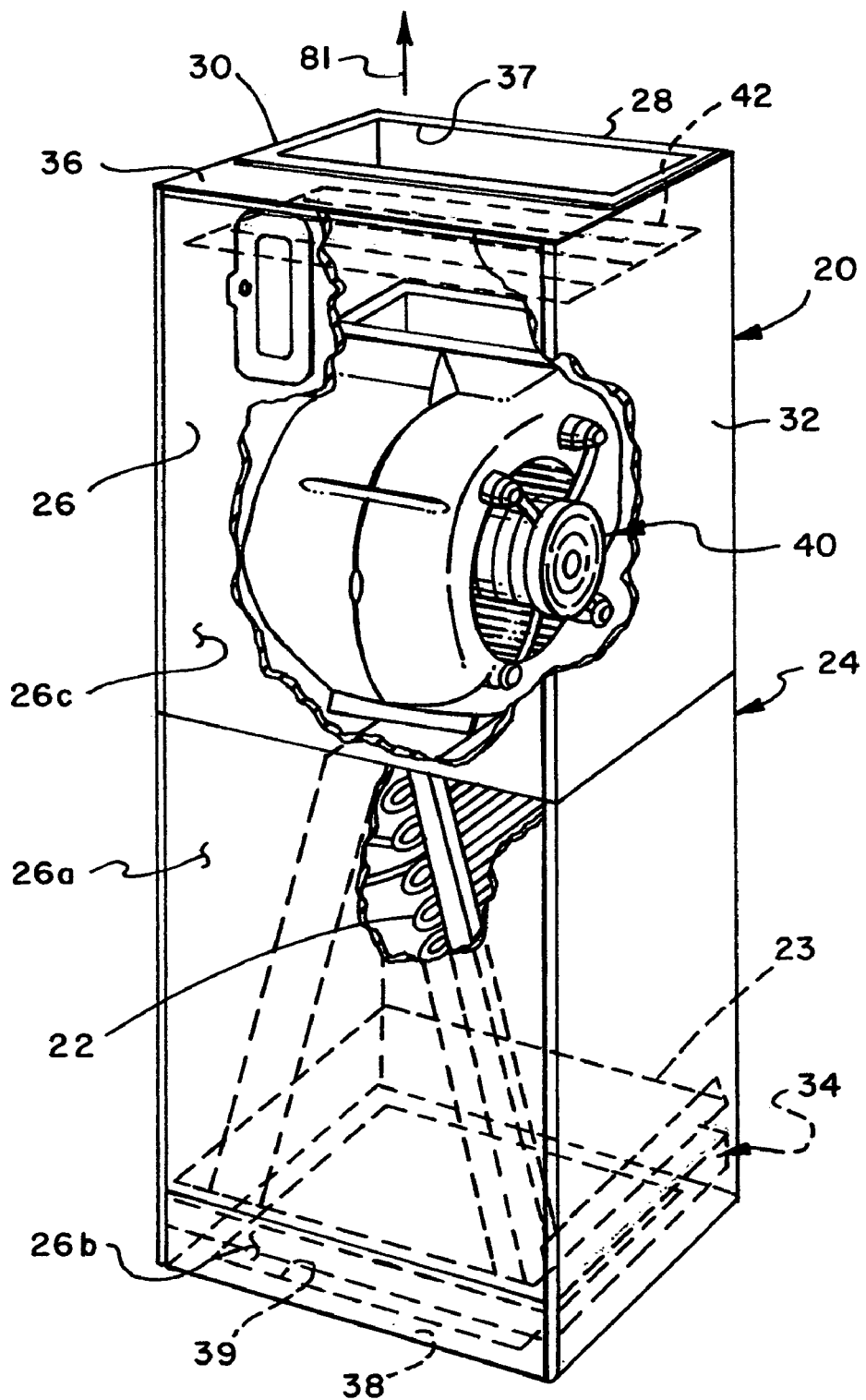
FIG. 1 is a perspective view of a unit of air conditioning apparatus including an intense field dielectric (IFD) type air filtration system incorporated therein.

In the description which follows like parts are marked throughout the specification and drawing with the same reference numerals, respectively. The drawing figures are not necessarily to scale and certain elements may be shown exaggerated in scale or in somewhat generalized or schematic form in the interest of clarity and conciseness.

Referring to FIG. 1, there is illustrated an air conditioning apparatus, generally designated by the numeral 20, which is characterized as an upright upward flow furnace but which also includes a vapor compression tube and fin type cooling coil or heat exchanger 22 disposed therein. In particular, the apparatus 20 includes a generally rectangular box-like metal cabinet 24 having a front wall 26, a backwall 28 and opposed sidewalls 30 and 32. The structural arrangement of cabinet 24 may take various forms wherein, for example, a skeletal metal frame is enclosed by removable sheet metal panels. For example, front wall 26 may have a removable panel 26a to allow access to the cooling coil 22 and to a cooling coil condensate drain pan 23. A second removable panel 26b of front wall 26 may be separately removed from the cabinet 24 to allow access to an integrated IFD air filtration system disposed in the cabinet and generally designated by the numeral 34.

Referring still further to FIG. 1, cabinet 24 includes a transverse top wall 36 and a transverse bottom wall 38 which are provided with, respectively, relatively large openings 37 and 39 to allow flow of air through the apparatus 20 generally vertically upward in a conventional manner. As shown in FIG. 1, apparatus 20 includes a motor driven forced air blower 40 disposed within cabinet 24 above the cooling coil 22 and operable to discharge air across one or more furnace heat exchangers, comprising grids of the electrical resistance type, and designated by numeral 42. Of course, other types of heat exchangers may be included within a cabinet, such as the cabinet 24, to provide heat exchange, including a combustion furnace, for example, or additional heating or cooling coils connected to a vapor compression refrigerant fluid flow circuit, all being of types well known. Moreover, the cabinet 24 and the components disposed therein may be arranged in a way such that air flow therethrough is generally horizontal or vertically downward, in keeping with arrangements in well known types of air conditioning apparatus.

A particular advantage of the apparatus 20 is the integration of the electrically energized or powered filtration system 34 within the cabinet 24. Advantages of this combination include those wherein, for example, the air filtration system may be shipped as an integral component of the apparatus 20 from the factory or point of final assembly by the apparatus manufacturer or supplier. The controls required for controlling operation of the IFD filtration system 34 may also be integrated into the controls for the air conditioning apparatus 20, all in the interest of efficiency, cost reduction, and eliminating mistakes, such as incorrect field installation processes, for example. Moreover, by including the IFD air filtration system 34 in the apparatus 20 installation space requirements for the apparatus do not require consideration for a possible add on filtration system.

Figure 2:
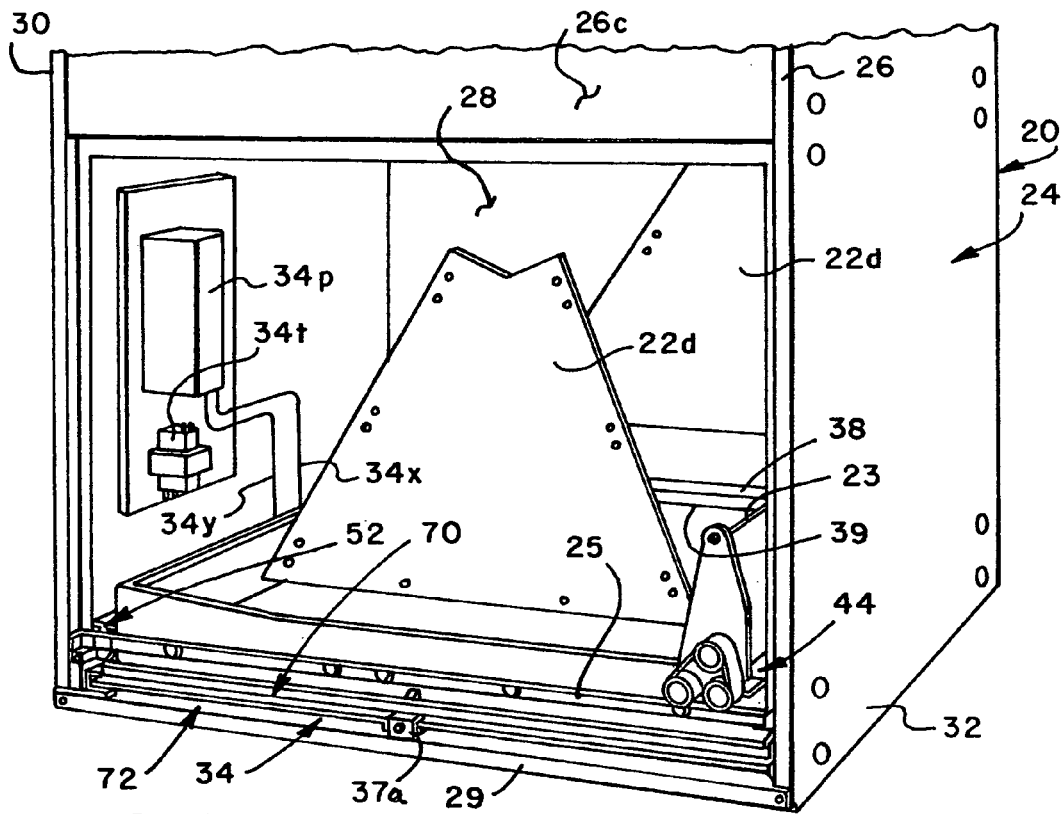
FIG. 2 is a detail perspective view of the apparatus shown in FIG. 1 with a cabinet door or panel removed and illustrating the specific location of the filtration system and a power supply unit therefor.
Figure 3:
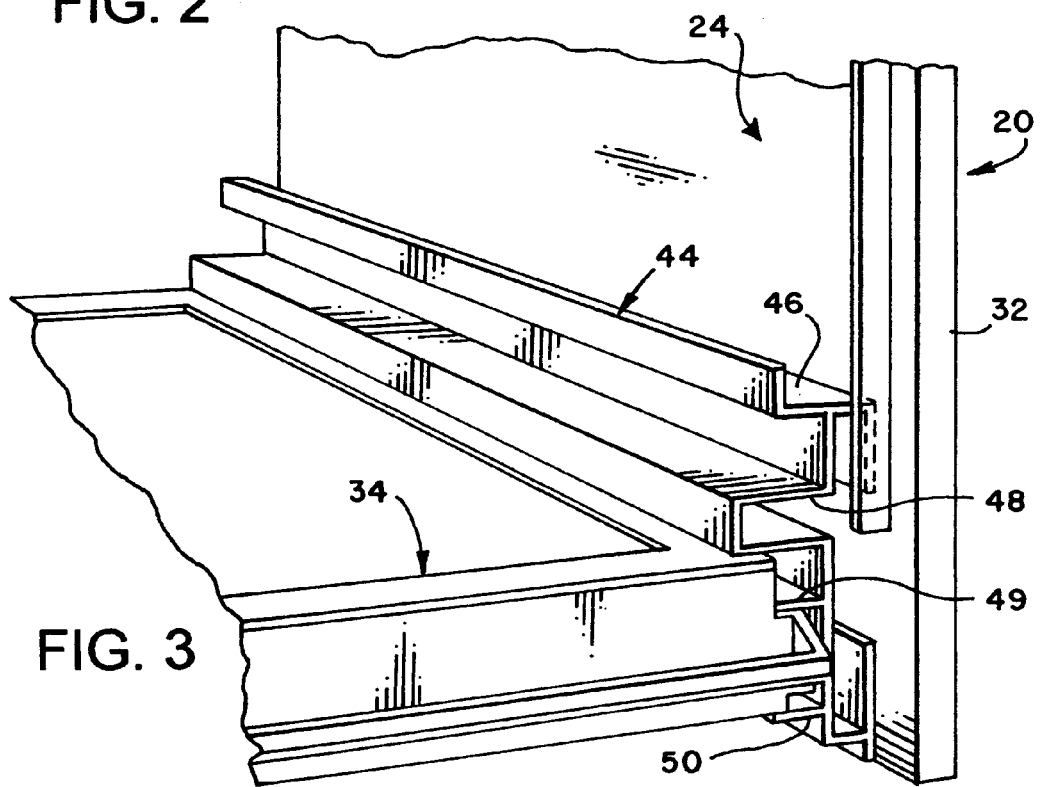
FIG. 3 is a detail perspective view of a portion of the cabinet shown in FIGS. 1 and 2 and showing additional details of an arrangement for supporting the air filtration system within the cabinet.

Referring now to FIGS. 2 and 3, the air conditioning apparatus 20 is illustrated with the panels 26a and 26b removed from cabinet 24 to further illustrate certain features of the filtration system 34 and its support structure. Front wall 26 is also provided in part by a third panel 26c, FIGS. 1 and 2, which does not require removal from the cabinet 24 to provide access to the filtration system 34 or the cooling coil 22. In FIGS. 2 and 3, the cooling coil 22 has been removed for purposes of illustration. However, in FIG. 2, condensate pan 23 is shown in its working position, together with its airflow baffles 22d which are spaced apart and are located such as to force air flow through the cooling coil 22 when it is disposed in its working position. A removable transverse frame member 25 is shown in its working position in FIG. 2 extending between sidewalls 30 and 32 and operable to provide at least partial support for the removable panels 26a and 26b , both removed in FIGS. 2 and 3. Still further, referring to FIG. 2, a removable transverse cabinet frame member 29 extends between sidewalls 30 and 32 at bottom wall 38 and supports a retainer clip 37a which, in its working position shown, is disposed such as to minimize a successful effort to separately remove from cabinet 24 a section of the filtration system 34 comprising a so-called field charging unit without first removing a separate filter unit, both to be described in further detail herein.

As also shown in FIG. 2, a portion of a control circuit for the filtration system 34 is illustrated mounted on the interior of sidewall 30 in a position readily accessible for service but also out of the way and relatively secure from tampering or being a cause of injury due to misuse. The portion of the control system illustrated includes a high voltage power supply unit 34p, a transformer 34t and high voltage conductors 34x and 34y extending from the power supply 34p to conductive paths associated with the IFD filtration system 34, as will be explained further herein. One advantage of the arrangement of the power supply and transformer as described hereinabove is that a transformer is provided as a step down transformer to twenty-four volts AC from one hundred twenty volts AC, for example. Power supply 34p receives low voltage power from the transformer 34t. Thus, at least certain components in the cabinet 24 including the transformer 34t and its input to the power supply 34p are operated at low voltage.

Figure 4:
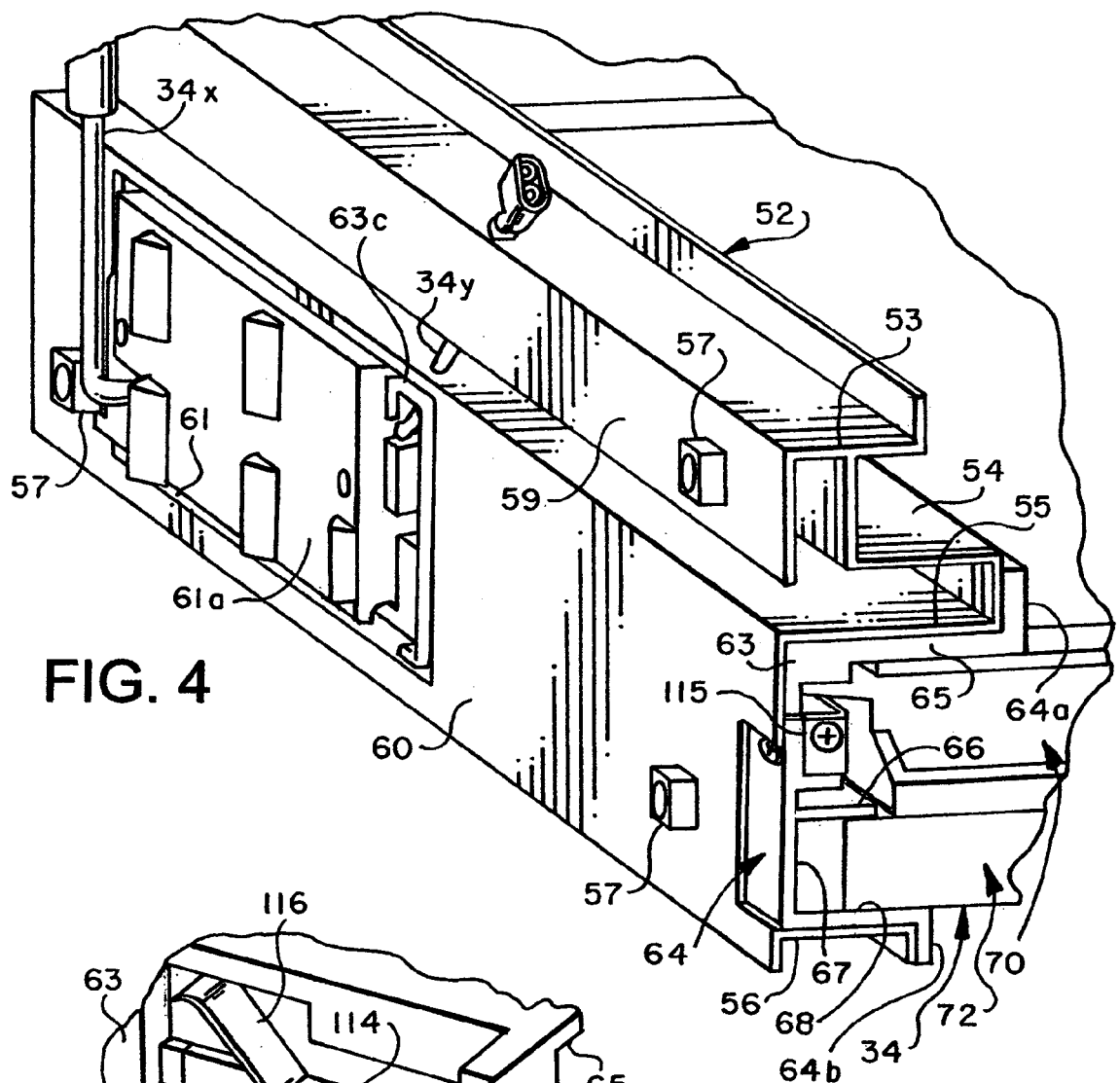
FIG. 4 is a detail perspective view illustrating certain structural features associated with providing electric power to the air filter unit and the field charging unit of the integrated IFD filtration system.

Referring further to FIGS. 3 and 4, in FIG. 3, there is illustrated a portion of lower sidewall 32 with bracket or frame members 25 and 29 removed to illustrate a filtration system sidewall mounting bracket, generally designated by the numeral 44. Bracket 44 includes first and second spaced apart flanges 46 and 48 providing a channel therebetween for receiving a side edge of condensate collection pan 23, not shown in FIG. 3. Bracket 44 includes third and fourth spaced apart flanges 49 and 50 coextensive with flanges 46 and 48, generally parallel thereto and defining therebetween a channel for receiving in supportive relationship a side edge of filtration system 34, as illustrated in FIG. 3.

As shown in FIG. 2, opposite cabinet sidewall 30 supports a second support bracket, generally designated by the numeral 52. Referring primarily to FIG. 4, wherein cabinet 24 has been removed for illustration purposes, support bracket 52 is illustrated in further detail and includes spaced apart parallel flanges 53 and 54 for receiving an opposite edge of condensate pan 23, also not shown in FIG. 4. Bracket 52 also includes spaced apart flanges 55 and 56 which are generally coextensive with and parallel to flanges 53 and 54. Flanges 55 and 56 define therebetween a channel for receiving an opposite side edge of filtration system 34 slidably therein. Both of brackets 44 and 52 are connected to their respective sidewalls 32 and 30 by suitable mechanical fasteners and may be secured in shallow standoff positions from the cabinet sidewalls by respective bosses. As shown by way of example in FIG. 4, fastener receiving standoff bosses 57 are supported by a depending flange 59 and a web 60 of bracket 52, as illustrated. Bracket 44 is provided with a corresponding flange and web for supporting standoff bosses which allow bracket 44 to also standoff slightly from sidewall 32. As shown in FIG. 4, bracket 52 includes a generally rectangular opening 61 in web 60 for receiving a portion of a housing 61a for electrical connections associated with the filtration system 34 and which will be described further herein.

Figure 6:
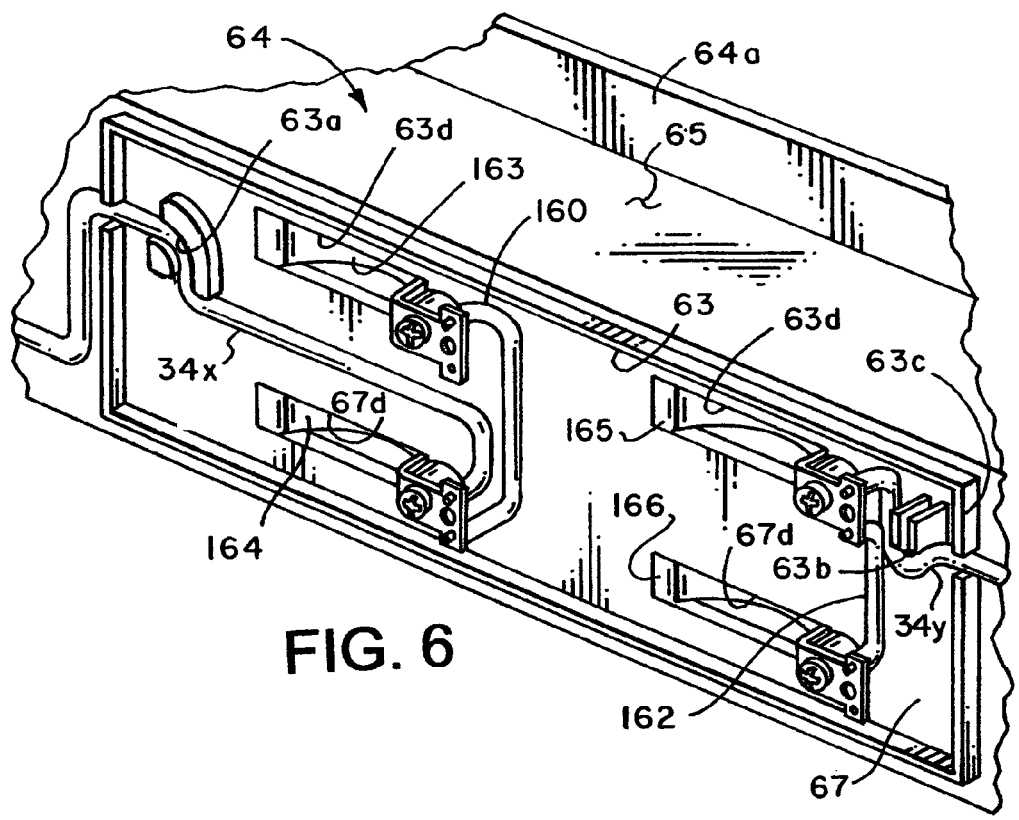
FIG. 6 is a detail perspective view illustrating certain features of electrical conductors and electrical contact elements for one preferred embodiment of an integrated air filtration system in accordance with the invention.
Figure 7:
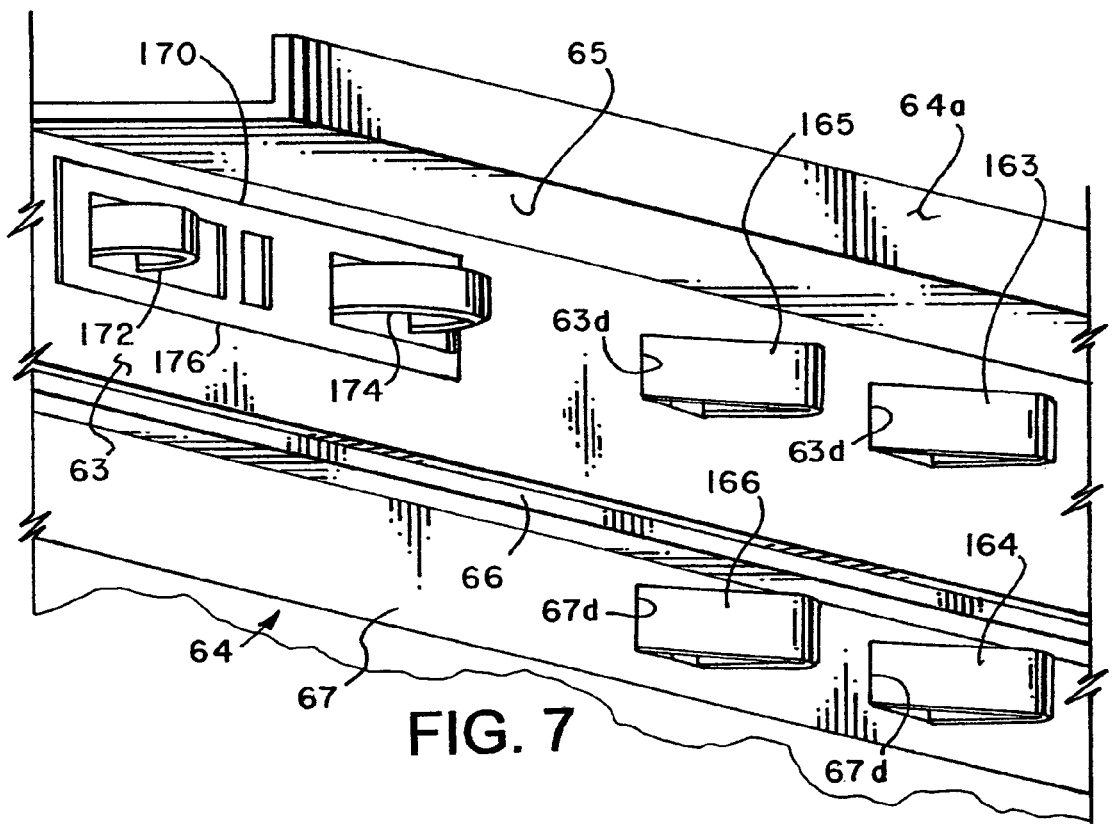
FIG. 7 is a detail perspective view of the structure shown in FIG. 6 taken from a different point of view.

As further shown in FIG. 4, as well as FIGS. 6 and 7, filtration system 34 is further supported at bracket 52 by a secondary or intermediate, electrically nonconductive bracket, panel or so-called rail, generally designated by numeral 64, which is nested within the channel of bracket 52 formed between flanges 55 and 56. Intermediate bracket 64 includes a first lateral flange 65 spaced from and parallel to a second lateral flange 66 which is spaced from and parallel to a third lateral flange 68. Flanges 66 and 68 are interconnected by a web 67 while flanges 66 and 65 are interconnected by a web 63 comprising a continuation of web 67. Bracket 64 is substantially coextensive with bracket 52, is removably received therein and may be mounted on and secured to bracket 52 at respective spaced apart flange portions 64a and 64b, for example, and using conventional mechanical fasteners, not shown. In this way, bracket 64 may be removed from bracket 52 when required.

Filtration system panel or bracket 64 is adapted to receive, in cooperation with mounting bracket 44, the filtration system 34 which includes a filter unit 70 and a field charging unit 72 separable from each other and cooperable with each other to form the filtration system 34. Filter unit 70 is supported between flanges 65 and 66 of panel or bracket 64 and between flanges 49 and 50 of bracket 44. Field charging unit 72 is supported between flanges 66 and 68 of panel or bracket 64 and also between flanges 49 and 50 of bracket 44. Filtration system 34 may be slidably removed from bracket 44 and panel or bracket 64 through the opening provided in cabinet 24 when panel member 26b is removed from the cabinet and when clip 37 is removed from the position shown in FIG. 2.

Figure 8:
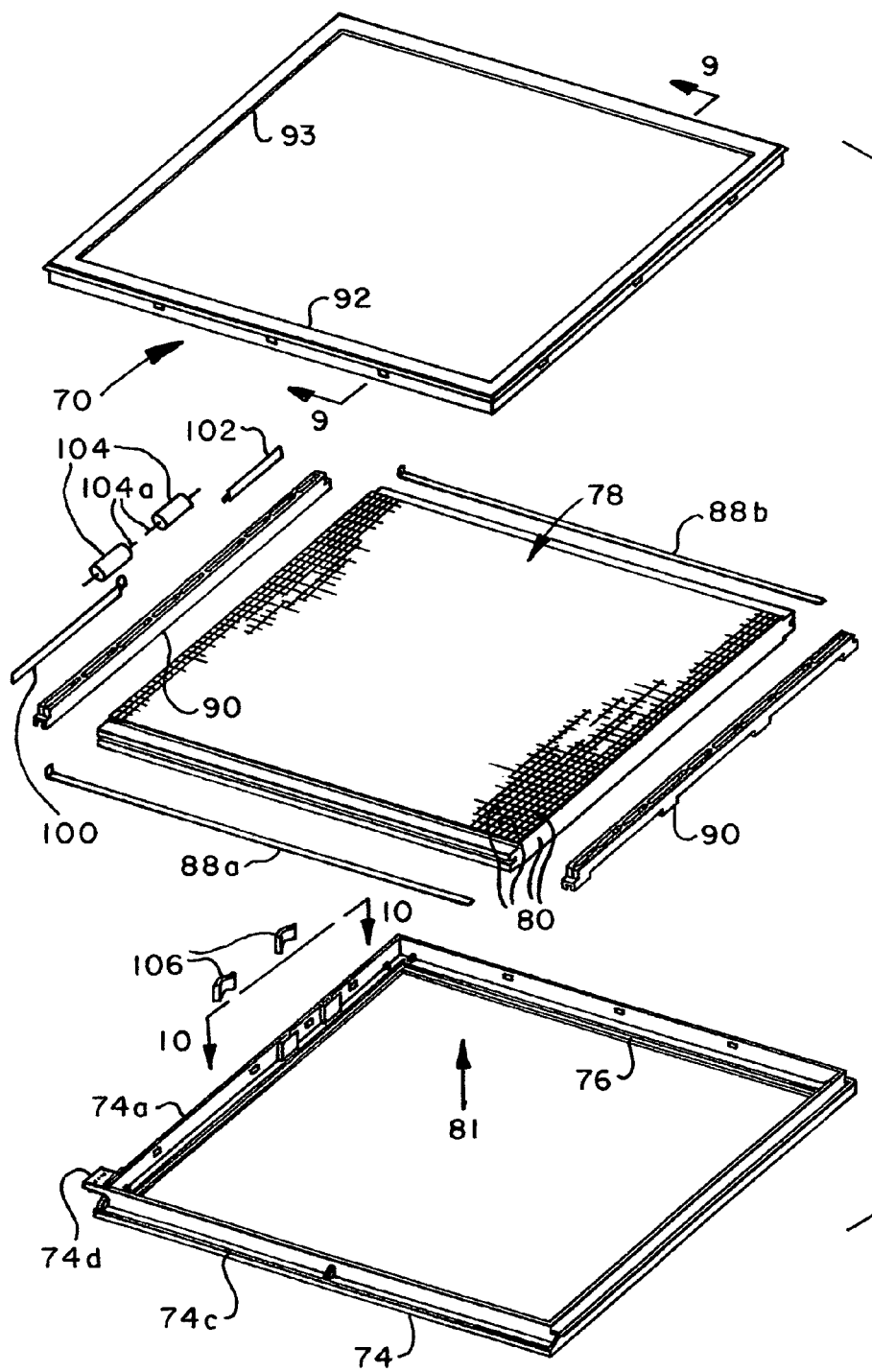
FIG. 8 is an exploded perspective view illustrating components of one preferred embodiment of the air filter unit of the IFD air filtration system.
Figure 9:
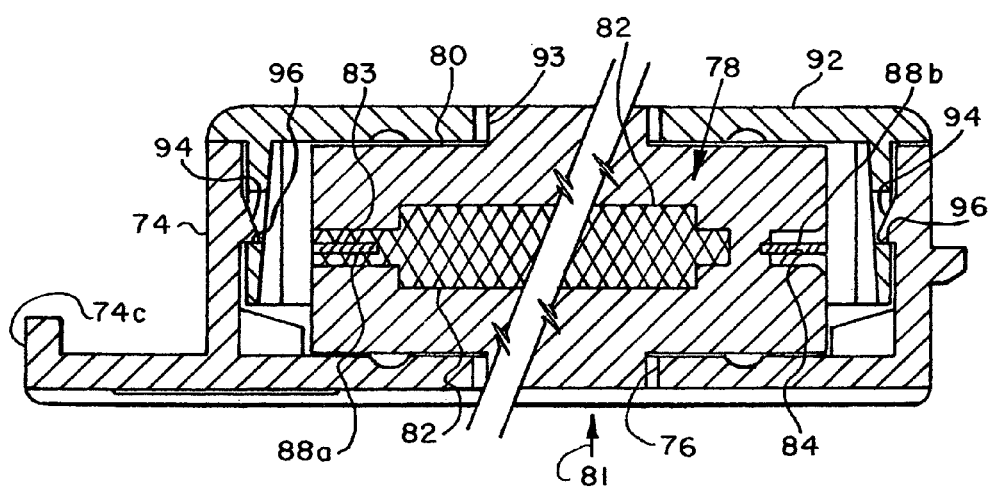
FIG. 9 is a detail section view of assembled components of the air filter unit taken generally from the line 9-9 of FIG. 8.

Referring now to FIGS. 8 and 9, the filter unit 70 is characterized by a generally rectangular perimeter frame 74 including a substantial opening 76 formed therein and also of a generally rectangular configuration. Frame 74 is adapted to receive and support a filter core assembly 78, FIGS. 8 and 9, comprising plural side-by-side contiguous filter elements 80. Filter elements 80 are constructed essentially like corresponding filter elements described in U.S. patent application Ser. No. 11/205,656 and may also be characterized as somewhat planar honeycomb-like structures. Accordingly, each filter element 80 is provided with plural parallel air flow passages extending therethrough whereby air may pass through each filter element and the core assembly 78 in the direction of arrow 81. Each filter element 80 is provided with an electrically conductive surface 82, FIG. 9, which may be provided by printing with a conductive ink on the surface of the filter element. Each filter element 80 is also provided with opposed slots 83 and 84 which are of different widths. Slots 83 intersect conductive surface 82, as shown in FIG. 9, but slots 84 do not. Filter elements 80 are formed of a suitable dielectric material, such as extruded polypropylene, except for the conductive surfaces 82.

Accordingly, in keeping with the construction and arrangement of the filter elements described in co pending application Ser. No. 11/205,656, filter elements 80 are stacked contiguous with each other, secured to each other with a suitable adhesive and are arranged alternately such that every other element has its slot 83 disposed adjacent a slot 84 of the adjacent element. In this way, a high voltage electrical charge potential may be imposed on the conductive surfaces 82 by respective elongated conductor strips 88a and 88b extending across opposite ends of the elements 80 within slots 83 and 84, FIGS. 8 and 9. Accordingly, an electrical field is created across the flow passages which extend through the respective filter elements 80 to attract and retain particulates in the air stream flowing therethrough as also taught by U.S. Pat. No. 6,749,669 issued on Jun. 15, 2004 to Griffiths, et al., which patent is also incorporated herein by reference.

As shown in FIG. 8, the filter element stack or core assembly 78 may be disposed on frame 74, between opposed spacers 90 and between the frame and a perimeter cover member 92 having an opening 93 therein of substantially the same dimensions as the opening 76. Cover member 92 may be releasably locked to frame member 74 by spaced apart elastically deflectable fingers 94 formed on frame 74, see FIG. 9, and disposed in suitable cooperating openings 96 formed on cover member 92. Frame member 74 also includes a flange 74c projecting from one side thereof to facilitate grasping the filter unit 70 for insertion in and removal from cabinet 24.

Figure 10:
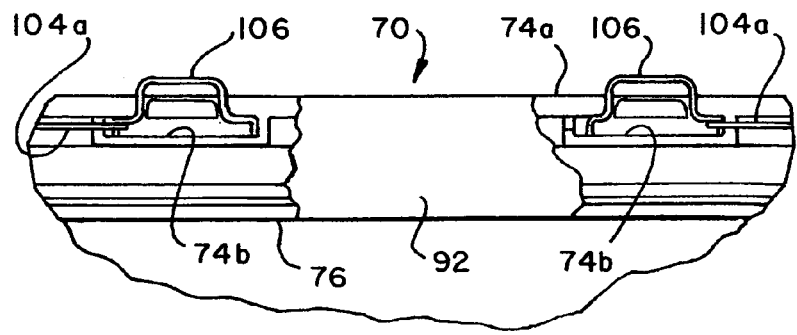
FIG. 10 is a detail view taken generally from line 10-10 of FIG. 8.

Referring still further to FIG. 8, electric potential is applied to the filter elements 80 at the conductive strips 88 by conductors 100 and 102 having suitable resistor elements connected thereto, respectively, and each generally designated by the numeral 104. A conductive path is further provided, as shown in FIG. 10, by spaced apart electrical contact elements 106 which project outwardly from a sidewall 74a of frame 74, are retained in cooperating slots 74b also formed in sidewall 74a and are suitably connected to conductor means 104a associated with the respective resistors 104. In this way, high voltage electric potential is applied to the filter elements 80 by way of the respective conductors 100 and 88a, and 102 and 88b and resistors 104, respectively. Accordingly, the filter unit 70 is preferably constructed substantially similar to the filter units described in the aforementioned patent and patent applications.

Figure 5:
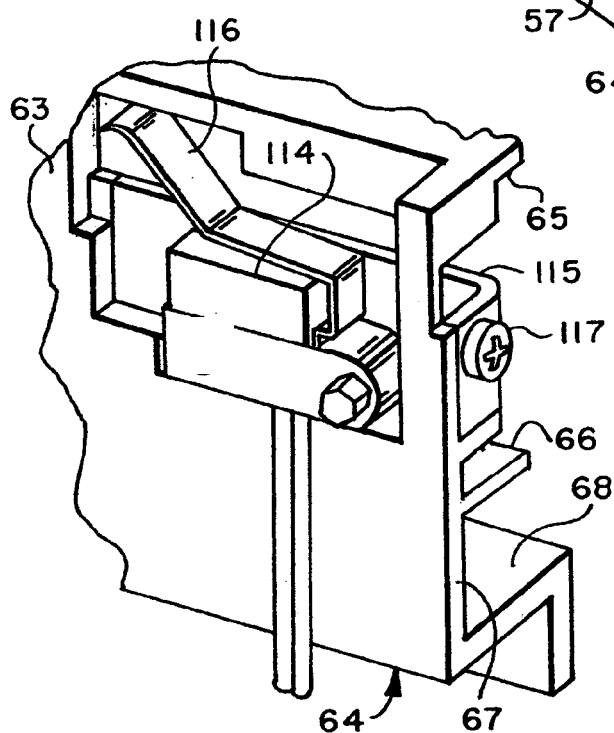
FIG. 5 is a detail perspective view illustrating a switch unit mounted on support structure for the filtration system and operable to shutoff electric power to the filtration system upon removal of the air filter unit of the system from the apparatus cabinet.

Referring further to FIG. 8, the frame 74 also includes a laterally projecting tab 74d formed on sidewall 74a and operable to engage a switch mounted on panel or bracket member 64 when the filter unit 70 is disposed in its working position and supported by the panel or bracket member 64 and the bracket members 44 and 52. For example, referring briefly to FIG. 5, there is illustrated a lever actuated switch 114 suitably mounted on bracket member 64 between flanges 65 and 66 and including an actuating lever 116 which is operable to engage the tab 74d on frame 74 when the filter unit 70 is disposed in its working position shown in FIG. 4. When the filter unit 70 is withdrawn from its working position, switch actuator 116 disengages from tab 74d and switch 114 opens to shutoff electrical power at least to the high voltage power supply 34p. Switch 114 is mounted on panel or bracket member 64 on a suitable support part 115 removably secured to bracket member 64 by a mechanical fastener 117, see FIG. 5. Alternatively, switch 114 or a second switch, not shown, may be positioned to be engaged by the field charging unit 72 so that, if the field charging unit was removable from cabinet 24 without first removing filter unit 70, power to the filtration system 34 would also be shut off.

Figure 14:
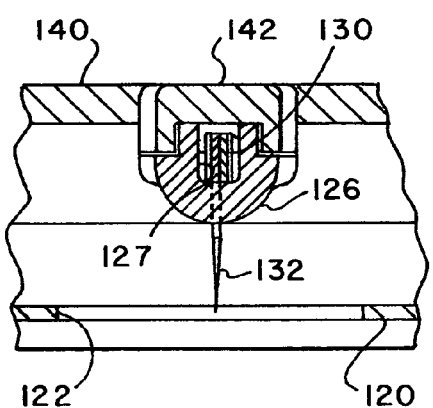
FIG. 14 is a detail section view of assembled components of the field charging unit taken from line 14-14 of FIG. 11.
Figure 11:
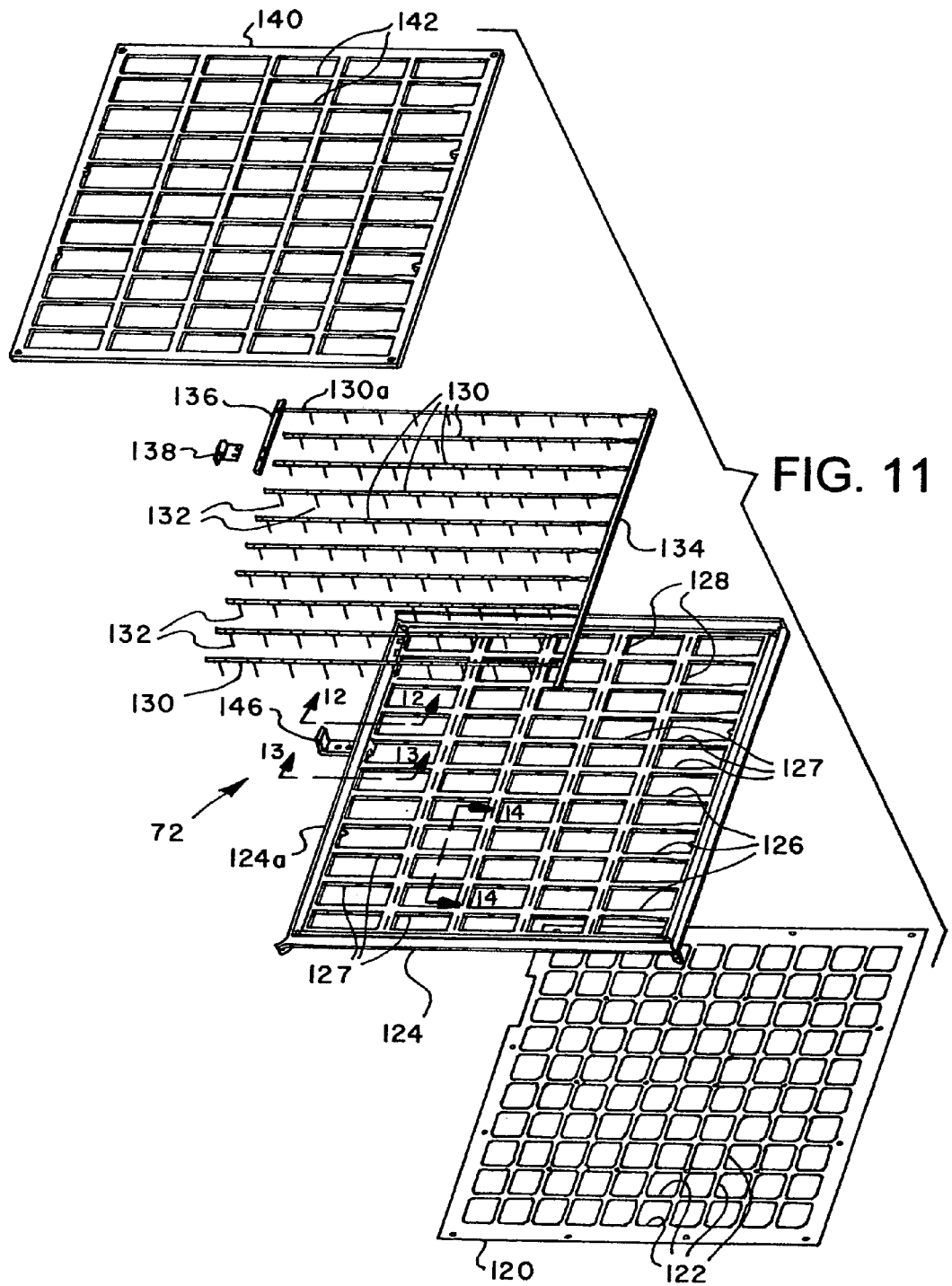
FIG. 11 is an exploded perspective view of the components of one preferred embodiment of the field charging unit for the air filtration system of the present invention.

Referring now to FIGS. 11 and 14, the field charging unit 72 is illustrated. Field charging unit 72 is similar in many respects to the corresponding field charging unit described in co-pending application Ser. No. 11/205,656. Field charging unit 72 includes a generally rectangular thin walled stainless steel, or similar metal, charging plate or so-called earth plate 120, having rows and columns of relatively large rectangular openings 122 formed therein, as illustrated. Plate 120 is suitably supported on a grid-like frame 124 which is provided with rows and columns of interconnected support members 126 and 128, respectively, and providing support for elongated electrically conductive pin support members 130 and 130a, each supporting plural, spaced apart axially projecting electrical charging pins 132 similar to the arrangement described in U.S. patent application Ser. No. 11/205,656.

Pin support members 130 and 130a are each connected at one end to a bus bar member 134 also supported on frame 124 and in electrically conductive communication with a conductor 136 and a contact member 138 suitably secured to conductor member 136 via member 130a. Pins 132 and their respective support members 130 and 130a together with bus member 134 and conductor 136, are supported on frame member 124 and retained thereon by a rectangular grid-like cover member 140 having a set of openings 142 formed therein aligned with and corresponding generally in size to openings 127 formed between the support members 126 and 128. When the charging unit 72 is assembled, the pins 132 project toward and are generally centered in the openings 122 of the charging plate 120, see FIG. 14.

Figure 12:
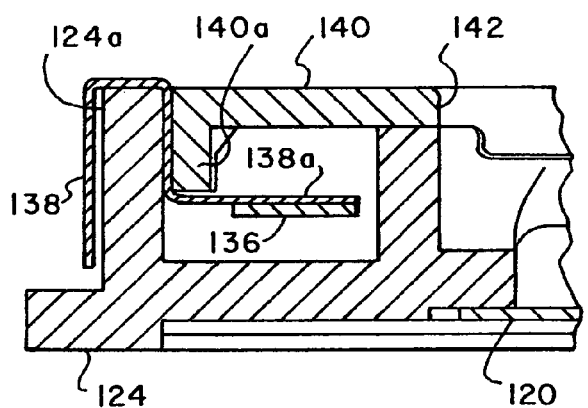
FIG. 12 is a detail section view of assembled components of the field charging unit taken generally from the line 12-12 of FIG. 11.
Figure 13:
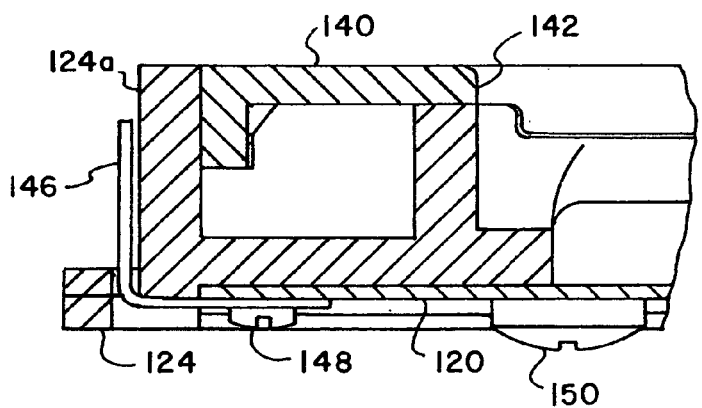
FIG. 13 is a detail section view of assembled components of the field charging unit taken generally from the line 13-13 of FIG. 11.

Referring now briefly to FIGS. 12 and 13, a sidewall 124a of frame 124 supports contact member 138 in the position illustrated in FIG. 12, standing off slightly from the sidewall and clamped between the sidewall 124a and a depending flange 140a of cover 140. As also shown in FIG. 12, contact member 138 has a part 138a suitably connected to conductor 136. High voltage electric potential is applied between the array of pins 132 and the field charging or earth plate 120, by way of the contact member 138, conductor 136, endmost pin support member 130a, FIG. 11, the bus bar 134, pin support members 130 and, as shown in FIG. 13, by way of a contact member 146 supported by frame 124 and standing off from sidewall 124a. Contact member 146 is suitably secured to plate 120 by fastener means 148, as shown in FIG. 13. Still further, FIG. 13 illustrates how field charging plate 120 is secured to frame 124 by one or more mechanical fasteners 150, one shown by way of example.

Referring now to FIGS. 6 and 7, the panel or bracket 64 is provided with means for conducting high voltage electric potential to the contacts 106 for the filter unit 70 and to the contacts 138 and 146 of the field charging unit 72 to provide the requisite intense electric field operable to provide the advantageous filtration process of the filtration system 34. The conductors 34x and 34y, FIG. 6, are trained through suitable strain relief and anchoring means 63a and 63b, which means are preferably molded into the web or wall 63 of panel or bracket member 64. A generally rectangular enclosure perimeter wall 63c is formed on the web 63 and which is closed by a removable cover 61a, see FIG. 4. Conductors 34x and 34y are suitably connected to conductors 160 and 162, respectively, FIG. 6, which in turn are connected to elastically deflectable contact members 163, 164, 165 and 166, respectively. Elastically deflectable contact members 163 and 165 are supported on web 63 and project through spaced apart openings 63d, and contact members 164 and 166 are supported on web 67 and project through spaced apart openings 67d, and are operable to engage the contacts on the filter unit 70 and the field charging unit 72. For example, when the field charging unit 72 is disposed in the working position shown in FIG. 4, contact members 164 and 138 are engaged with each other while contact members 166 and 146 are engaged with each other to provide a high voltage potential between the pins 132 and the charging or earth plate 120. In like manner, contact members 163 and 165 engage the respective spaced apart contact members 106, FIG. 10, when filter unit 70 is slidably disposed in the cabinet 24 in the working position shown in FIGS. 2, 3 and 4, and as described hereinbefore.

As further shown in FIG. 7, web 63 of panel or bracket member 64 supports a so-called shorting member, generally designated by numeral 170 and including spaced apart elastically deflectable metal contact members 172 and 174 which are integral with a generally rectangular flat plate frame or support part 176 suitably mounted on web 63 and aligned with the contact members 163 and 165. Accordingly, when filter unit 70 is removed from the position shown in FIGS. 2, 3 and 4, by being slidably moved out of the channel formed between flanges 55 and 66, contact members 106 become at least momentarily engaged with contact members 172 and 174, respectively, whereby any residual high voltage potential existing across contact members 163 and 165 is discharged, effectively, by the shorting of these contacts, thanks to the shorting member 170. Moreover, as filter unit 70 is slidably moved out of engagement with bracket or panel member 64, switch 114 moves to an open position to eliminate high voltage potential across contact members 163 and 165 and across contact members 164 and 166. Field charging unit 72 does not retain an electric charge thereon and does not require a shorting member as required by filter unit 70.

Figure 15:
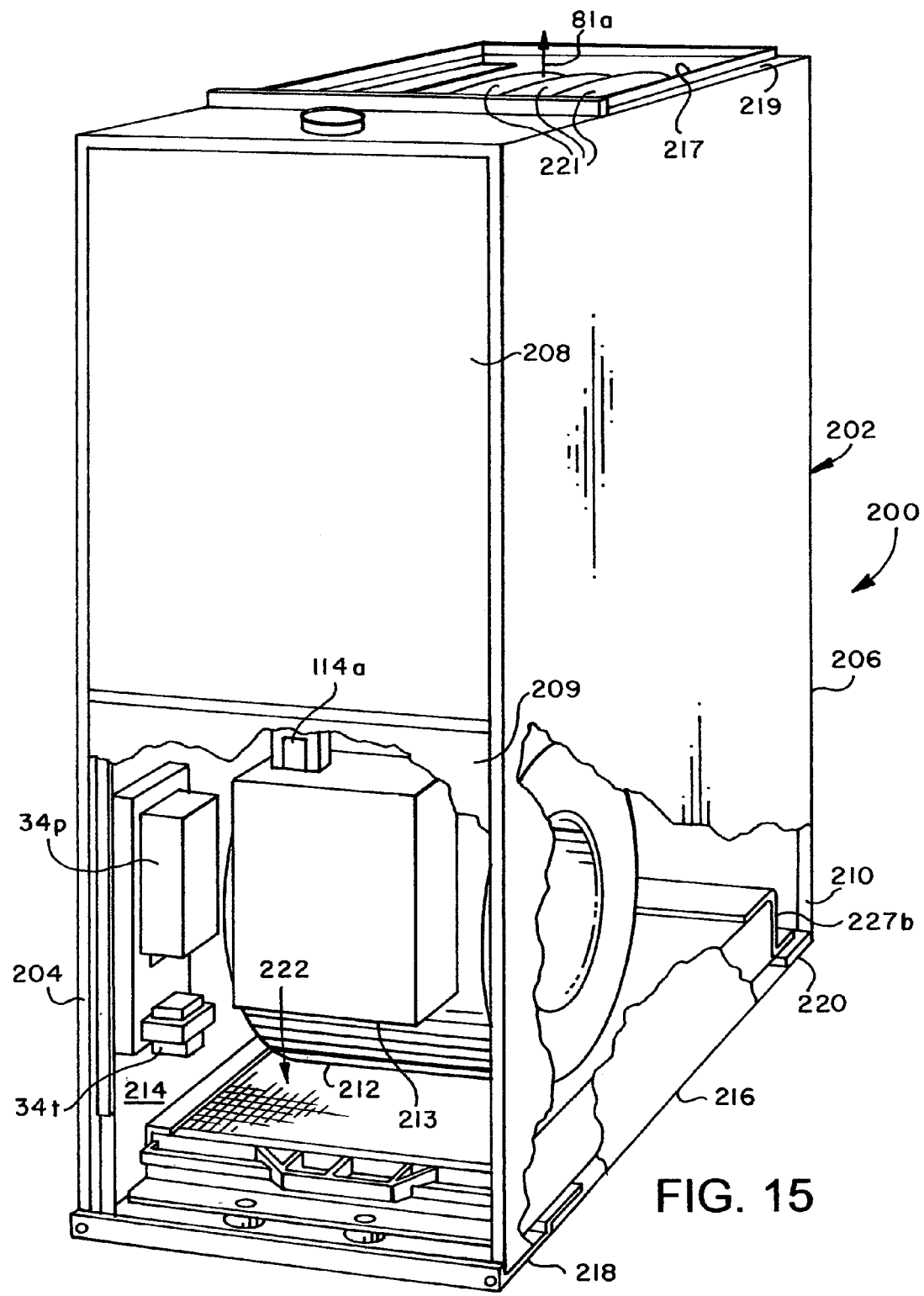
FIG. 15 is a perspective view of a combustion furnace including an integrated air filtration system in accordance with another preferred embodiment of the present invention.

Referring now primarily to FIG. 15, another preferred embodiment of an air filtration system in accordance with the invention is illustrated integrated into an air conditioning apparatus comprising a furnace, generally designated by the numeral 200. Furnace 200 is disposed in a cabinet 202 similar in some respects to the cabinet 24 and including opposed sidewalls 204 and 206, a front wall 208, removable front wall panel 209, partially shown, and a backwall 210. A motor driven blower 212 is disposed within a space 214 for drawing air from an inlet opening 216 in a bottom wall or bottom side of the cabinet 202, which opening is defined between opposed bottom wall parts or support plate members 218 and 220, as illustrated. Sidewall 206 is broken away to illustrate further details of an air filtration system 222 which is mounted directly above opening 216 and is supported within the cabinet 202 by the spaced apart bottom wall plate members 218 and 220. A transformer 34t and power supply 34p are also mounted within the cabinet 202 in generally the same location as for the embodiment illustrated in FIGS. 1 through 14. Removable front wall panel or door 209 has been partially broken away to illustrate the location of the air filtration system 222 and the power supply 34p. Suitable furnace controls may be disposed within an enclosure 213 also mounted within the space 214, as shown in FIG. 15. Apparatus 200 includes an air outlet opening 217 in a top wall 219, FIG. 15, and heat exchangers 221 disposed within cabinet 202, as shown. Air flow through apparatus 200 is from inlet opening 216 to outlet opening 217 generally in the direction of arrow 81a.

Figure 16:
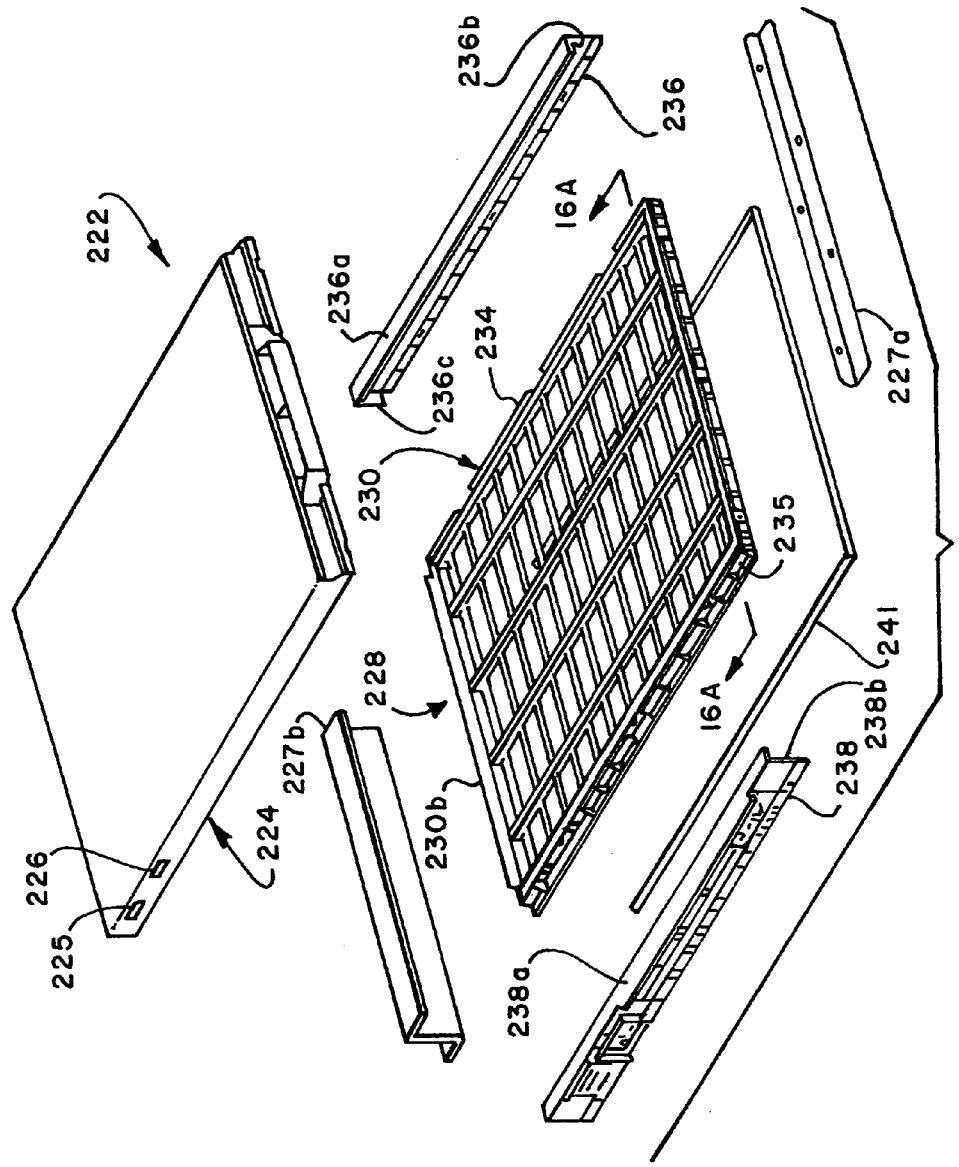
FIG. 16 is an exploded perspective view of major components of the air filtration system shown in FIG. 15.
Figure 16A:
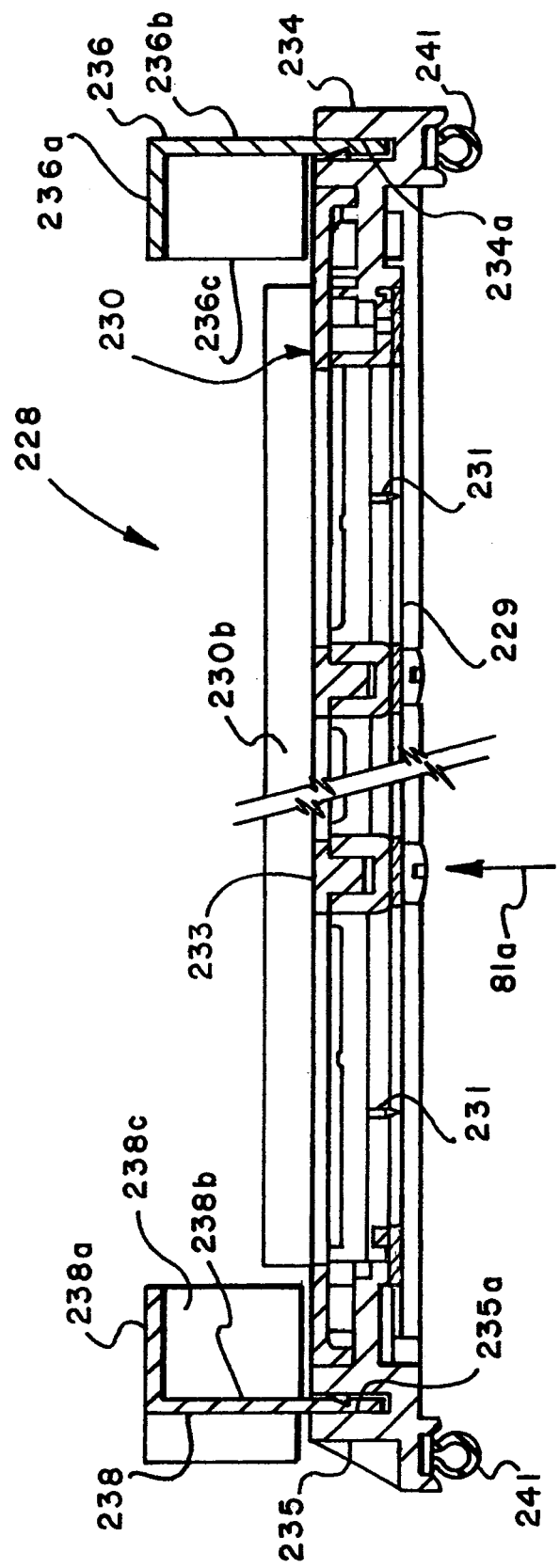
FIG. 16A is a section view of assembled components of the system shown in FIG. 16 and taken from line 16A-16A of FIG. 16.

Referring now to FIGS. 16 and 16A, the air filtration system 222 includes a filter unit 224 substantially like the filter unit 70 and including spaced apart contact elements 225 and 226 for communicating high voltage potential to the filter unit 224 in the same manner as described for the filtration system 34. The filtration system 222 includes a field charging unit 228 similar in some respects to the field charging unit 72 and separable from the filter unit 224 in a manner to be described further herein. As shown in FIGS. 16 and 16A, field charging unit 228 is characterized by a generally rectangular grid-like frame assembly including an earth plate 229, FIG. 16A, substantially like the earth plate 120 and connected to a grid-like frame 230 including spaced apart rows of charging pins 231, two shown in FIG. 16A, but arranged substantially like the charging pins 132 of the embodiment of the filtration system illustrated in FIGS. 11 and 14. Frame 230 includes a grid-like cover member 233 corresponding substantially to the cover member 140 of the charging unit 72. Frame 230 differs from the frame 124 in that opposed longitudinal integral frame parts 234 and 235 are provided with elongated slots 234a and 235a, see FIG. 16A, in which are supported elongated, parallel, support bracket members 236 and 238 which may be disposed in the respective slots by a snap-in type fit or connection. Support bracket members 236 and 238 are substantially angle shaped parts including right angle flanges 236a, 236b, 238a, and 238b, respectively, for receiving the side edges of the filter unit 224 and for retaining the filter unit supported on the frame 230. An elongated strip-like gasket 241 is supported on the bottom side of frame 230 for engaging with a support surface to form a substantial seal around the periphery of the filtration system 222 when disposed in its working position. Support brackets 236 and 238 further include respective stop walls 236c and 238c positioned substantially coplanar with a stop wall part 230b of frame 230 for limiting movement of the filter unit 224 when it is moved into its working position supported on the frame 230 and retained in its working position by the support brackets 236 and 238. Filtration system 222 is secured in cabinet 202 by retainer members 227a and 227b, FIGS. 15 and 16, which are adapted to mount on plate members 218 and 220, respectively, and releasably secured thereto by convential fasteners. Retainer member 227a requires disconnection from bottom plate member 218 in order to remove charging unit 228 from cabinet 202.

Figure 17:
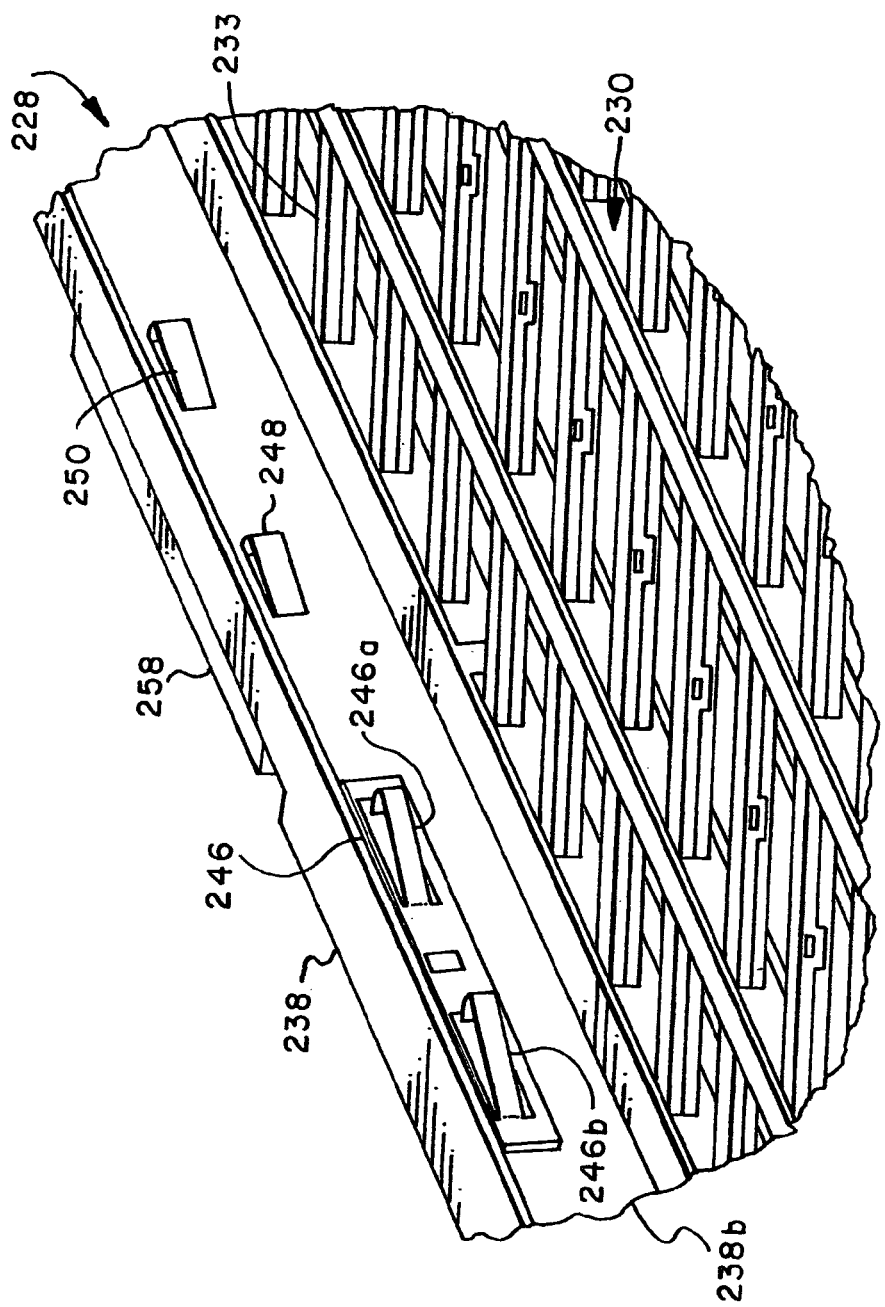
FIG. 17 is a detail perspective view illustrating the shorting contacts for the embodiment of the filtration system shown in FIGS. 15 and 16.

Referring now to FIG. 17, wherein filter unit 224 has been removed for purposes of illustration, bracket flange 238b supports an elongated high voltage shorting bar 246 disposed in alignment with contact members 248 and 250 which are engageable with the contact elements 225 and 226 of the filter unit 224 when the filter unit is disposed in its working position shown in FIG. 15. Accordingly, as the filter unit 224 is removed from the filtration system 222 through the front side of the furnace 200, viewing FIG. 15, contact elements 225 and 226 simultaneously engage the shorting bar 246 at its respective contact elements 246a, and 246b, FIG. 17, to discharge any high voltage potential on the filter unit 224 in the same manner that the high voltage potential of the filter unit 70 is discharged upon its removal from the filtration system 34.

Figure 18:
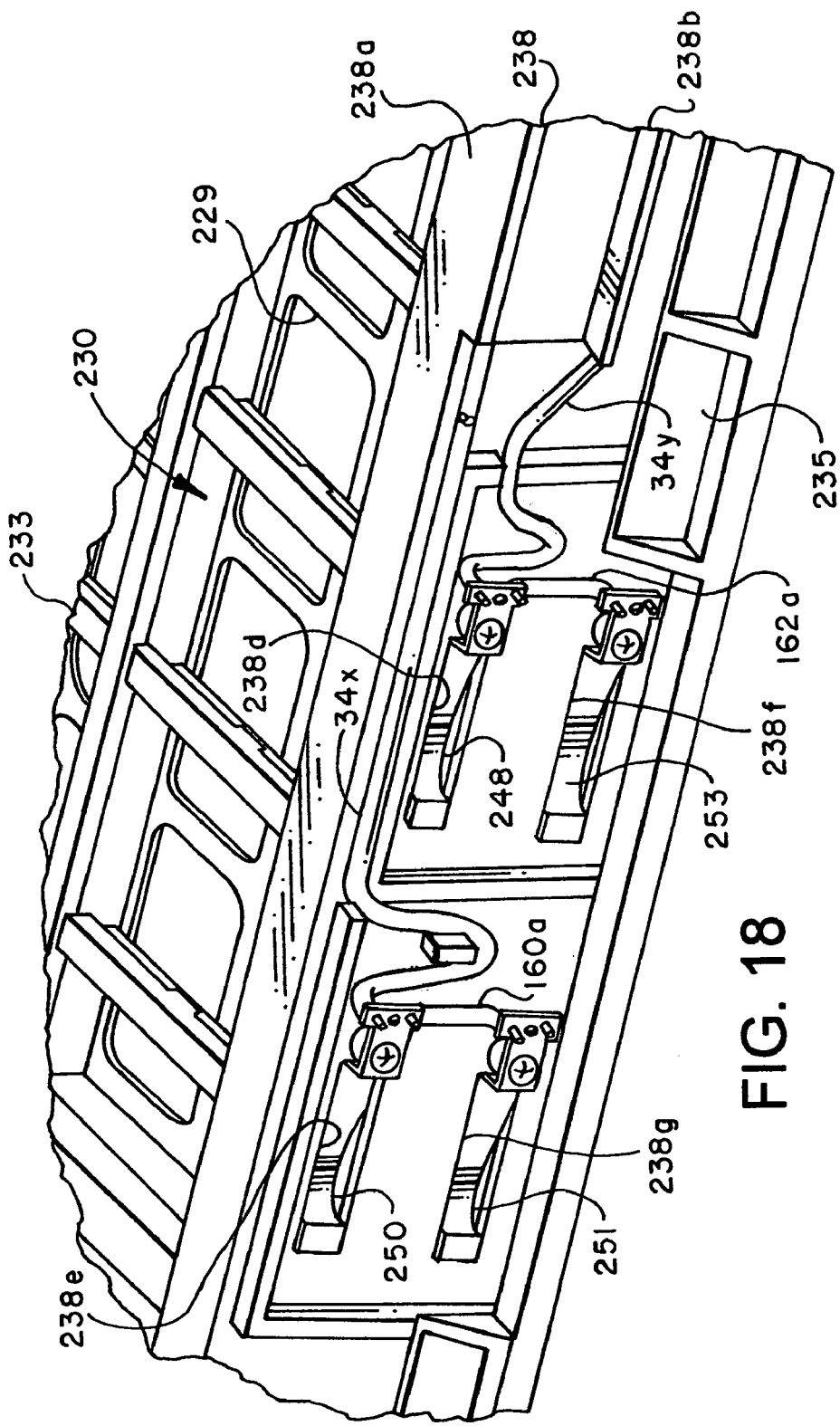
FIG. 18 is a detail perspective view showing further electrical contacts for the embodiment of the invention shown in FIGS. 15 through 17.

Referring now to FIG. 18, the flange 238b of bracket 238 supports contact members 248 and 250 in the manner illustrated wherein the contact members extend through respective slots 238d and 238e formed in flange 238b and are connected to conductors 34x and 34y by suitable connections, as illustrated. Contact members 248 and 250 are suitably mounted on the flange 238b by respective fasteners, as shown. Flange 238b is also provided with additional slots 238f and 238g in which are disposed respective contact members 253 and 251. Contact members 253 and 251 are engaged with corresponding contact members formed on the field charging unit 228 in substantially the same manner as provided for the field charging unit 72. High voltage electric potential is imposed on the filter unit 224 and the field charging unit 228 by way of the conductors 34x and 34y and conductors 160a and 162a which interconnect the contact elements 250 and 251 and the contact elements 248 and 253, respectively. A suitable cover 258, FIG. 17, may be disposed over the contact elements 248, 250, 251 and 253 in essentially the same manner that the cover 61a is disposed over the contact elements for the embodiment illustrated in FIG. 4.

Figure 19:
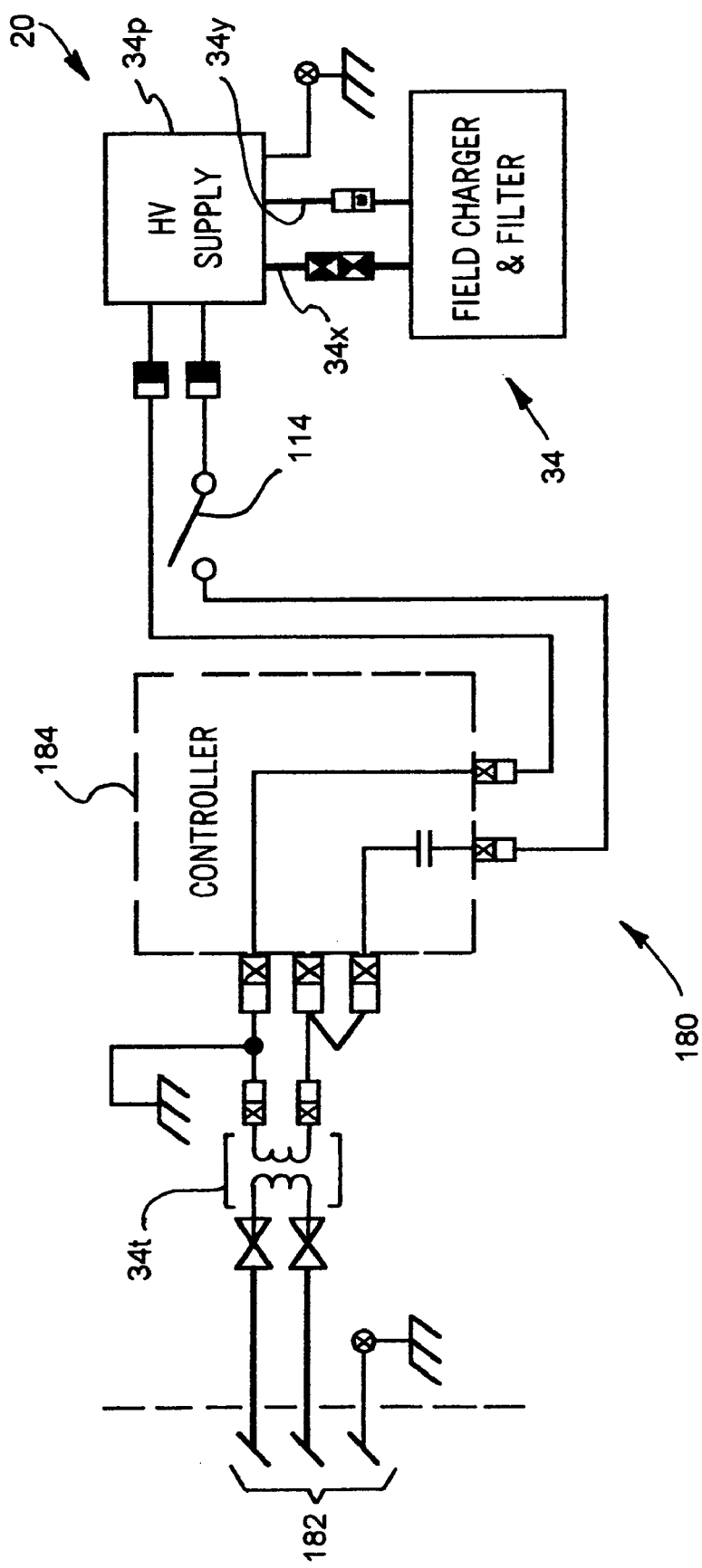
FIG. 19 is a schematic diagram of a control system adapted for use with the embodiment of the invention illustrated in FIGS. 1 through 14.

Referring now to FIG. 19, there is illustrated a control system for the air conditioning apparatus 20 and the air filtration system 34 associated therewith. The control system illustrated in FIG. 19 is generally designated by the numeral 180 and is further characterized by a source of alternating current (AC) electric power by way of a conductor set 182 operably connected to transformer 34t which provides 24 volt AC power to a controller unit 184 which, in turn, is operably connected to high voltage power supply 34p. Power supply 34p is connected to the filtration system 34, including the respective field charging unit and filter unit described hereinabove. In the circuitry of FIG. 19, switch 114 is interposed the high voltage power supply 34p and the controller 184. Accordingly, as previously described, when the filter unit 70 is removed from the filtration system 34, switch 114 opens to prevent energization of the high voltage power supply 34p.

Figure 20:
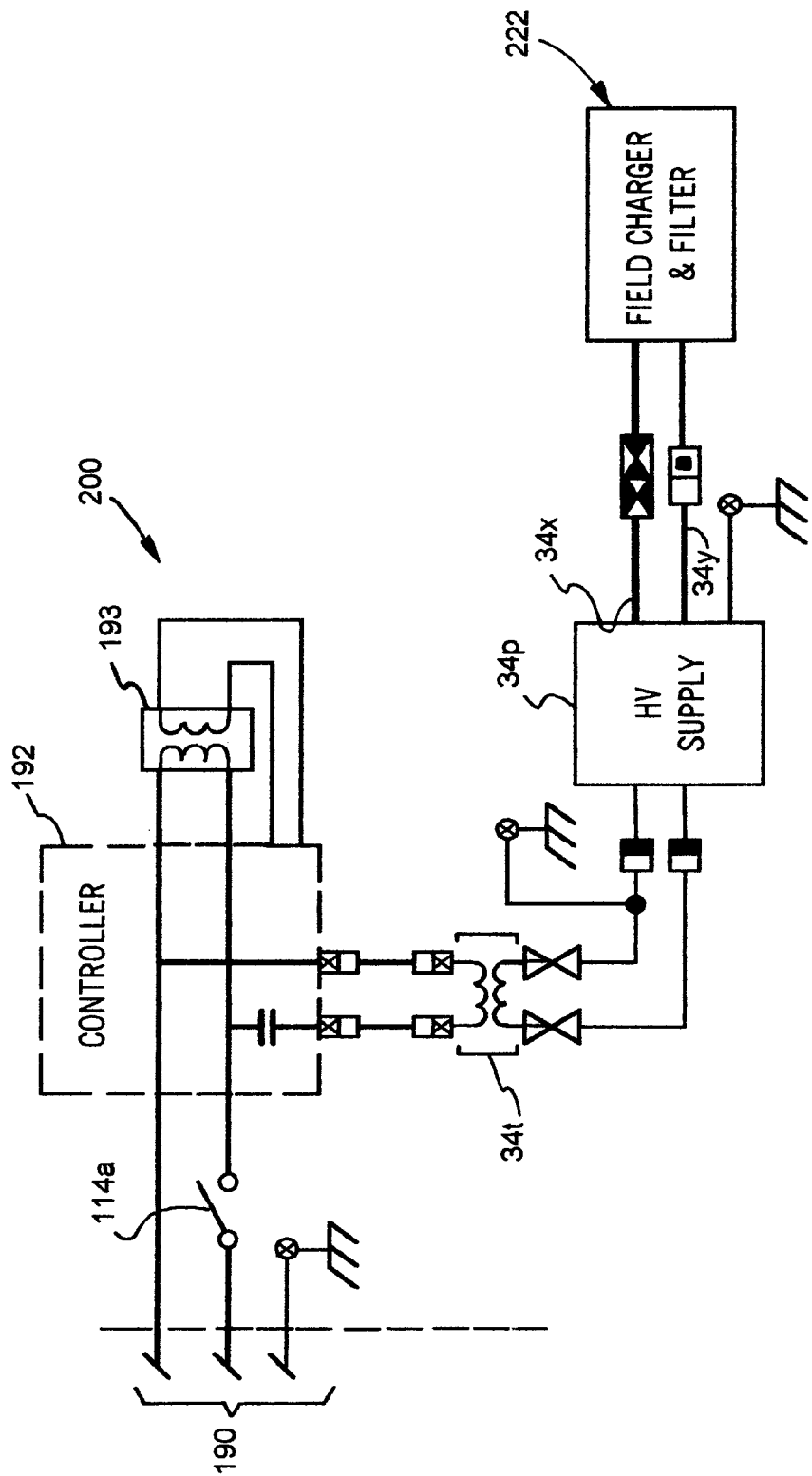
FIG. 20 is a schematic diagram of a control system adapted for use with the embodiment of the invention illustrated in FIGS. 15 through 18.

Referring now to FIG. 20, the furnace 200 and associated air filtration system 222 are supplied with electrical power from a source of alternating current (AC) by way of a conductor set 190 in which is interposed a so-called door switch 114a similar to switch 114 and preferably mounted on cabinet 202, FIG. 15, at a suitable location such that when door or panel 209 is removed from the cabinet 202 to provide access to the space 214, switch 114a opens to shut off electrical power to a controller 192, transformer 34t and high voltage power supply 34p which is operable otherwise to provide electrical power to filtration system 222, including its field charging unit and filter unit, respectively. Accordingly, when panel 209 is removed from the cabinet 202 the switch 114a will open to prevent electrical power from being transmitted to the controller 192 and to the high voltage power supply 34p. The control system illustrated in FIG. 20 further includes a second transformer 193 for supplying electrical power to the controller 192, as illustrated.

Power supply 34p may be capable of delivering high voltage potential to filtration systems 34 and 222 at a selected one of multiple levels, between seven kilovolts and ten kilovolts, for example, whereby selection of the filtration system operating voltage potential may be such as to minimize the generation of ozone, if desired.

The construction and operation of the filtration systems 34 and 222 integrated into the air conditioning apparatus 20 and 200, respectively, is believed to be readily understandable to those of ordinary skill in the art based on the foregoing description. The engineering materials and methods used to construct the apparatus 20 and 200 and the filtration systems 34 and 222 may be similar to those described in U.S. patent application Ser. No. 11/205,656 or U.S. Pat. No. 6,749,669 and are otherwise believed to be understandable or recognized by those skilled in the art.

The components of filter units 70, 224 except for electrical conductors, including the frame member 74 and cover 92, the support bracket 64 and cover 61a, for example, may be formed of substantially non-electrically conductive, molded and extruded material, such as ABS thermoplastic. Such material may also be used for the frame members of field charging units 72. Polypropylene is typically used for the filter elements 80. The pins 132 are preferably formed of tungsten to minimize degradation in use.

Although preferred embodiments of an integrated air conditioning apparatus and electrically energized filtration system have been described in detail herein, those skilled in the art will also recognize that various substitutions and modifications may be made without departing from the scope and spirit of the appended claims.

What is claimed is:

1. An air conditioning apparatus including:
   a cabinet having an air inlet opening and an air outlet opening, said cabinet including opposed walls forming an enclosed flow path for air flowing through said apparatus between said openings;
   a blower disposed within the cabinet;
   a heat exchanger disposed between the blower and the air inlet opening; and
   an electrically energized air filtration system integrated into said apparatus and disposed in said cabinet for filtering an air flowstream passing through said cabinet between said inlet opening and said outlet opening;
   wherein a portion of the air filtration system is disposed between the heat exchanger and the air inlet opening and a portion of the air filtration system is disposed between a bottom of the heat exchanger and the air outlet opening.

2. The apparatus set forth in claim 1 wherein:
   said filtration system includes a filter unit and an electric field charging unit for imposing a high voltage electric field on said air flowstream for collecting particles on said filter unit from said air flowstream.

3. The apparatus set forth in claim 2 wherein:
   said electric field charging unit is mounted in said cabinet upstream from said filter unit with respect to the direction of air flow through said filtration system, said filter unit and said field charging unit each being operable to be connected to a source of high voltage electric potential.

4. The apparatus set forth in claim 3 wherein:
   said filter unit includes a frame, and a filter element supported on said frame and exposed to said source of high voltage electric potential for attracting particulates passing through said filter unit.

5. The apparatus set forth in claim 3 wherein:
   said field charging unit is disposed adjacent said filter unit, said field charging unit including a frame, a field charging plate having plural openings formed therein, plural spaced apart conductor pins mounted on said frame and disposed in alignment with said openings in said charging plate, respectively, and a conductor operably connected to said conductor pins and said charging plate, respectively, for imposing an intense electric field in a space through which air flow occurs between said inlet opening and said outlet opening.

6. The apparatus set forth in claim 3 wherein:
   said filter unit and said field charging unit are separable and removable from said cabinet, respectively.

7. The apparatus set forth in claim 6 including:
   filtration system support structure comprising spaced apart support bracket members disposed in said cabinet.

8. The apparatus set forth in claim 7 wherein:
   said support bracket members are supported on opposed walls of said cabinet, and said support bracket members include support parts engageable with said filtration system for removably mounting said filtration system in said cabinet and interposed in said air flowstream.

9. The apparatus set forth in claim 7 wherein:
   said support bracket members are mounted on a frame of said field charging unit for supporting said filter unit with respect to field charging unit.

10. The apparatus set forth in claim 7 wherein:
    one of said support bracket members includes spaced apart bracket contact members disposed thereon and engageable with cooperating spaced apart ones of contact members on said filter unit, respectively, for imposing a high intensity electric field on said filter unit when said filter unit is disposed in said cabinet.

11. The apparatus set forth in claim 10 wherein:
    said field charging unit includes spaced apart contact members in electrically conductive communication with plural spaced apart charging pins and a cooperating field charging plate, respectively, and said support structure includes cooperating bracket contact members disposed thereon and engageable with said contact members of said field charging unit, respectively.

12. The apparatus set forth in claim 11 wherein:
    said source of electric potential comprises a power supply unit and a conductor interconnecting said power supply unit with said bracket contact members for communicating a high voltage electric potential to said filter unit and said field charging unit.

13. The apparatus set forth in claim 11 including:
    an intermediate bracket interposed one of said support bracket members and said filtration system and supporting said bracket contact members.

14. The apparatus set forth in claim 10 including:
    an electrical shorting part aligned with said bracket contact members whereby in response to movement of said filter unit out of said support structure said shorting part engages respective ones of said contact members on said filter unit to discharge electric potential residing on said filter unit.

15. The apparatus set forth in claim 3 wherein:
    said source of electric potential comprises a power supply unit disposed in said cabinet.

16. The apparatus set forth in claim 15 wherein:
    the power supply unit is operable to provide an electric potential to said filtration system at selected values in a range of about seven kilovolts to ten kilovolts.

17. The apparatus set forth in claim 15 including: a control circuit connected to said power supply unit and a switch interposed in said control circuit for shutting off power to said power supply unit.

18. The apparatus set forth in claim 17 wherein:
    said switch is mounted for engagement by one of said filter unit and said field charging unit when disposed in a working position on said apparatus, and said switch being operable upon movement toward removal of said one of said filter unit and said field charging unit from said cabinet to shut off electric power to said power supply unit.

19. The apparatus set forth in claim 17 wherein:
said switch is mounted for engagement with a panel of said cabinet and said switch is responsive to removal of said panel for shutting off power to said power supply unit.

20. The apparatus set forth in claim 2 wherein:
said filter unit includes a perimeter frame, a filter core assembly mountable on said frame including a stack of contiguous filter elements, said filter elements being disposed wherein alternate ones of said filter elements include a surface conductor in electrically conductive contact with a positive high voltage potential and a negative high voltage potential, respectively.

21. The apparatus set forth in claim 20 including:
an elongated conductor member disposed in a slot in each of alternate ones of said filter elements and in electrically conductive contact with said surface conductor respectively.

22. The apparatus set forth in claim 3 wherein:
said apparatus includes a panel removable from said apparatus to provide access to said filtration system and a retainer mounted on said apparatus and engaged with said field charging unit to prevent removal of said field charging unit from said cabinet prior to removal of said filter unit from said cabinet.

23. The air conditioning apparatus according to claim 1, wherein the portion of the air filtration system that is disposed between the bottom of the heat exchanger and the air outlet opening comprises a power supply of the air filtration system.

24. The air conditioning apparatus according to claim 1, wherein the portion of the air filtration system that is disposed between the bottom of the heat exchanger and the air outlet opening comprises a transformer of the air filtration system.

25. An air conditioning apparatus comprising:
a cabinet including a forced air blower disposed therein between an air inlet opening and an air outlet opening, said cabinet including opposed walls forming an enclosed flow path for air flowing through said apparatus between said openings;
a heat exchanger disposed between the blower and the air inlet opening;
an electrically energized air filtration system disposed in said cabinet for filtering an air flowstream passing through said cabinet between said openings, including a filter unit and an electric field charging unit disposed upstream of said filter unit with respect to the direction of air flow through said cabinet, said filter unit and said field charging unit including electrical contact member operable to be in contact with a source of high voltage electric potential; and
spaced apart support bracket members disposed in said cabinet and including support parts engageable with said filtration system for removably mounting said filtration system in said cabinets;
wherein a portion of the air filtration system is disposed between the heat exchanger and the air inlet opening and a portion of the air filtration system is disposed between a bottom of the heat exchanger and the air outlet opening.

26. The apparatus set forth in claim 25 including:
an intermediate bracket interposed one of said support brackets and said filtration system and supporting spaced apart bracket contact members, a power supply, and a conductor interconnecting said power supply with said bracket contact members for communicating a high voltage potential to said filter unit and said field charging unit by way of said bracket contact members and said contact members on said filter unit and said field charging unit, respectively.

27. The apparatus set forth in claim 26 wherein:
said field charging unit includes plural spaced apart charging pins and a cooperating field charging plate, respectively, and respective ones of said bracket contact members are disposed thereon and engageable with said contact members of said field charging unit, respectively, when said field charging unit is placed in a working position in said cabinet.

28. The apparatus set forth in claim 27 wherein:
said filter unit and said field charging unit are separable and are slidably disposed in said intermediate bracket for mounting in and removal from said cabinet, respectively.

29. The apparatus set forth in claim 28 including:
an electrical shorting part on said intermediate bracket and aligned with said bracket contact members whereby in response to movement of said filter unit out of said support structure said shorting part engages respective ones of said contact members on said filter unit to discharge any electric potential residing on said filter unit.

30. The apparatus set forth in claim 25 wherein:
said source of high voltage electric potential comprises a power supply unit disposed in said cabinet.

31. The apparatus set forth in claim 30 wherein:
said power supply unit is operable to provide an electric potential to said filtration system at selected values in a range from about seven kilovolts to about ten kilovolts.

32. The apparatus set forth in claim 30 including:
a control circuit connected to said power supply unit and a switch interposed in said control circuit and field charging unit when disposed in a working position on said apparatus, said switch being operable upon movement toward removal of said one of said filter unit and said field charging unit from said cabinet to shut off electric power to said power supply.

33. The air conditioning apparatus according to claim 25, wherein at least one of the filter unit and the electric field charging unit are selectively removable by sliding in a direction substantially orthogonal to the direction of air flow through said cabinet.

34. An air conditioning apparatus comprising:
a cabinet including a forced air blower disposed therein between an air inlet opening and an air outlet opening, said cabinet including opposed walls forming an enclosed flow path for air flowing through said apparatus between openings;
a heat exchanger disposed between the blower and the air inlet opening;
an electrically energized air filtration system disposed in said cabinet for filtering an air flowstream passing through said cabinet between said openings, including a filter unit and an electric field charging unit disposed upstream of said filter unit with respect to the direction of air flow through said cabinet, said filter unit and said field charging unit including electrical contact members operable to be in contact with a source of high voltage electric potential; and
a support engageable with said filtration system for mounting said filtration system in said cabinet;
wherein a portion of the air filtration system is disposed between the heat exchanger and the air inlet opening and a portion of the air filtration system is disposed between a bottom of the heat exchanger and the air outlet opening.

35. The apparatus set forth in claim 34 wherein:
said field charging unit includes a frame engaged with said support for mounting and spaced apart support brackets connected to said frame for receiving said filter unit supported on said frame for removal therefrom.

36. The apparatus set forth in claim 35 wherein:
one of said support brackets supports spaced apart bracket contact members, said apparatus includes a power supply and a conductor interconnecting said power supply with said bracket contact members for communicating a high voltage potential to said filter unit and said field charging unit by way of said bracket contact members.

37. The apparatus set forth in claim 36 including:
an electrical shorting part on one of said support brackets whereby in response to movement of said filter unit out of said support brackets said shorting part engages respective ones of contact members on said filter unit to discharge any electric potential residing on said filter unit.

38. The apparatus set forth in claim 34 including:
a control circuit connected to said source of electric potential and a switch interposed in said control circuit and mounted for engagement by a movable panel of said cabinet and being operable upon movement of said panel to gain access to one of said filter unit and said field charging unit to shut off electric power to said source of electric potential.

39. The air conditioning apparatus according to claim 34, wherein the electric field charging unit is selectively removable and wherein the electric field charging unit comprises a plurality of electrical charging pins.

* * * * *

UNITED STATES PATENT AND TRADEMARK OFFICE
CERTIFICATE OF CORRECTION

PATENT NO.       : 7,601,204 B2
APPLICATION NO.  : 11/516263
DATED            : October 13, 2009
INVENTOR(S)      : Woodruff et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 430 days.

Signed and Sealed this

Fifth Day of October, 2010

David J. Kappos
*Director of the United States Patent and Trademark Office*